United States Patent [19]

Nykerk

[11] Patent Number: 5,315,285
[45] Date of Patent: * May 24, 1994

[54] ALARM SYSTEM FOR SENSING AND VOCALLY WARNING A PERSON APPROACHING A PROTECTED OBJECT

[75] Inventor: Michael Nykerk, Canoga Park, Calif.

[73] Assignee: Electronic Security Products of California, Inc., Canoga Park, Calif.

[*] Notice: The portion of the term of this patent subsequent to Nov. 7, 2007 has been disclaimed.

[21] Appl. No.: 875,061

[22] Filed: Apr. 28, 1992

Related U.S. Application Data

[63] Continuation of Ser. No. 610,402, Nov. 7, 1990, Pat. No. 5,117,217, which is a continuation of Ser. No. 423,987, Oct. 11, 1989, Pat. No. 4,987,402, which is a continuation-in-part of Ser. No. 260,933, Oct. 21, 1988, Pat. No. 4,897,630, which is a continuation-in-part of Ser. No. 5,873, Jan. 21, 1987, Pat. No. 4,794,368.

[51] Int. Cl.[5] .................. B60R 25/10; B60Q 1/00
[52] U.S. Cl. ....................... 340/426; 340/460; 340/425.5; 340/429; 340/692; 379/40
[58] Field of Search ........... 340/426, 429, 460, 692, 340/693, 539, 531, 541, 309.15, 561, 565, 567, 551, 425.5; 307/91, 10.1, 10.2; 381/51, 53, 86, 110; 379/40

[56] References Cited

U.S. PATENT DOCUMENTS

| | | | |
|---|---|---|---|
| 3,471,652 | 10/1969 | Moore et al. | 179/100.1 |
| 3,560,978 | 12/1970 | Lemelson | 340/539 |
| 3,581,014 | 8/1971 | Vogel et al. | 179/100 |
| 3,855,574 | 12/1974 | Welty | 340/148 |
| 3,925,751 | 12/1975 | Bateman et al. | 340/27 |
| 3,987,408 | 10/1976 | Sassover et al. | 340/64 |
| 4,205,300 | 5/1980 | Ho et al. | 340/65 |
| 4,218,763 | 8/1980 | Kelley et al. | 340/65 |
| 4,325,058 | 4/1982 | Wagner et al. | 340/562 |
| 4,337,462 | 6/1982 | Lemelson | 340/572 |
| 4,346,427 | 8/1982 | Blissett et al. | 361/173 |
| 4,359,714 | 11/1982 | Tsunoda et al. | 340/52 |
| 4,383,242 | 5/1983 | Sassover et al. | 340/64 |
| 4,393,365 | 7/1983 | Kondo et al. | 340/57 |
| 4,395,135 | 7/1983 | Frantz | 368/63 |

(List continued on next page.)

OTHER PUBLICATIONS

"Auto Alarm Systems", *Consumer Reports*, pp. 658–662, Oct. (1986).
Kaplan, et al., "Realism in Synthetic Speech", *IEEE Spectrum*, pp. 32–37, Apr. (1985).
Kaplan, et al., "Industrial Electronifs", *IEEE Spectrum*, pp. 50–52, Jan. (1988).
"Auto Security Even Kadafi Would Love", *Installation News*, vol. 3(1):18–19, Nov. (1985).
Advertisement for "Ungo Box TL-1500 Remote Vehicle Security System", *Installation News*, vol. 3(1), p. IN/28, Nov. (1985).
"Passive Disarming", *Installation News*, vol. 3(2):12, Dec. (1985).
"Auto Security", *Installation News*, vol. 3(3):4, Jan. (1986).

*Primary Examiner*—Donnie L. Crosland
*Attorney, Agent, or Firm*—Fitch, Even, Tabin & Flannery

[57] ABSTRACT

An alarm system senses the presence of a person sufficiently near a protected object, such as an automobile, to inflict damage thereto, and provides verbal warnings to the person. The alarm system includes a proximity detector that senses the proximity of a person to the protected object and means for generating vocal signals using electronic speech generation circuits. Such vocal signals typically instruct the person to back away from the protected object, thereby preventing the person from inflicting any damage to the object. The user may select various operating modes and performance options in how the system is used.

15 Claims, 9 Drawing Sheets

U.S. PATENT DOCUMENTS

| | | | |
|---|---|---|---|
| 4,401,971 | 8/1983 | Saito et al. | 340/52 F |
| 4,410,884 | 10/1983 | Heiland | 340/545 |
| 4,414,541 | 11/1983 | Ho | 340/566 |
| 4,450,437 | 5/1984 | Ho | 340/540 |
| 4,455,551 | 6/1984 | Lemelson | 340/539 |
| 4,464,651 | 8/1984 | Duhame | 340/521 |
| 4,465,904 | 8/1984 | Gottsegen et al. | 179/5 R |
| 4,531,527 | 7/1985 | Reinhold, Jr. et al. | 128/696 |
| 4,538,135 | 8/1985 | Turner | 340/63 |
| 4,539,557 | 9/1985 | Redshaw | 340/539 |
| 4,558,181 | 12/1985 | Blanchard et al. | 179/5 P |
| 4,571,583 | 2/1986 | Giordano | 340/692 |
| 4,581,605 | 4/1986 | Vogt | 340/525 |
| 4,642,612 | 2/1987 | Crump | 340/541 |
| 4,709,330 | 11/1987 | Yokoi et al. | 364/400 |
| 4,716,582 | 12/1987 | Blanchard et al. | 379/41 |
| 4,725,827 | 2/1988 | Gallegos et al. | 340/696 |
| 4,748,654 | 5/1988 | Gray | 379/40 |
| 4,754,266 | 1/1988 | Shand et al. | 340/691 |
| 4,772,875 | 9/1988 | Maddox et al. | 340/522 |
| 4,794,368 | 12/1988 | Grossheim et al. | 340/426 |
| 4,821,027 | 4/1989 | Mallory et al. | 340/521 |
| 4,845,464 | 7/1989 | Drori et al. | 340/426 |
| 4,853,678 | 8/1989 | Bishop et al. | 340/573 |
| 4,887,064 | 12/1989 | Drori et al. | 340/426 |
| 4,897,630 | 1/1990 | Nykerk | 340/426 |
| 4,901,054 | 2/1990 | Waterman | 340/426 |
| 4,922,224 | 5/1990 | Drori et al. | 340/428 |
| 4,987,402 | 1/1991 | Nykerk | 340/426 |
| 5,117,217 | 5/1992 | Nykerk | 340/426 |

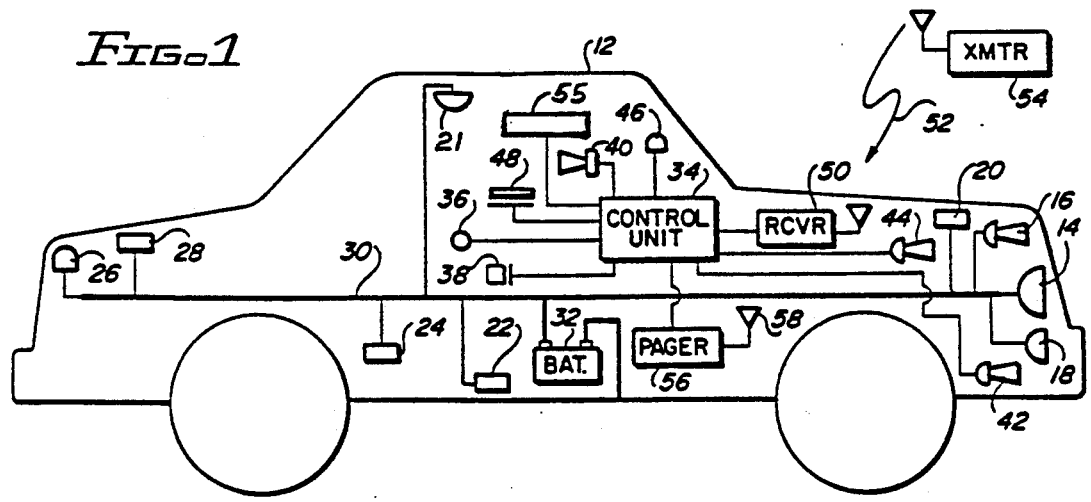
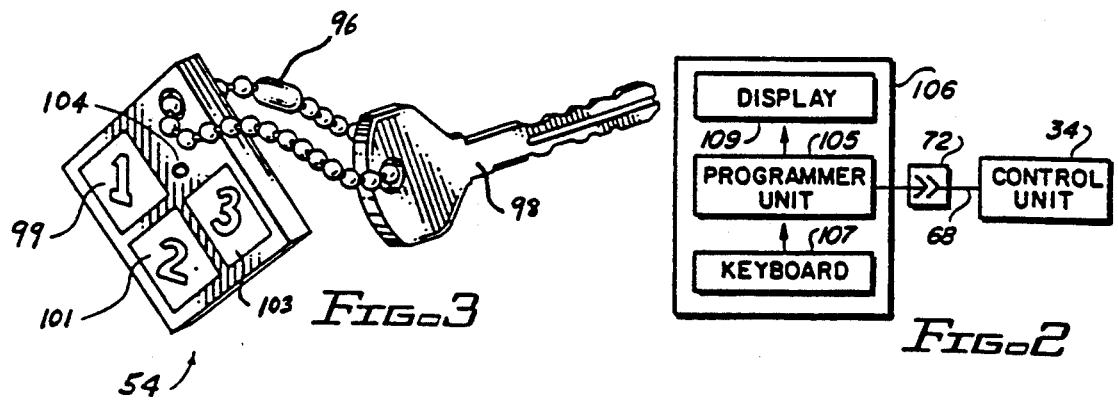

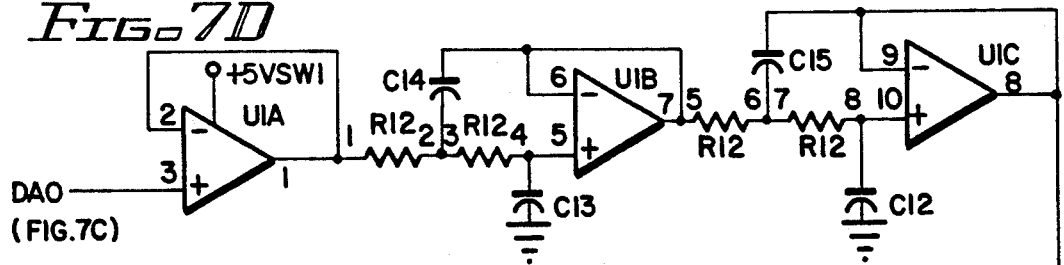
Fig. 7D
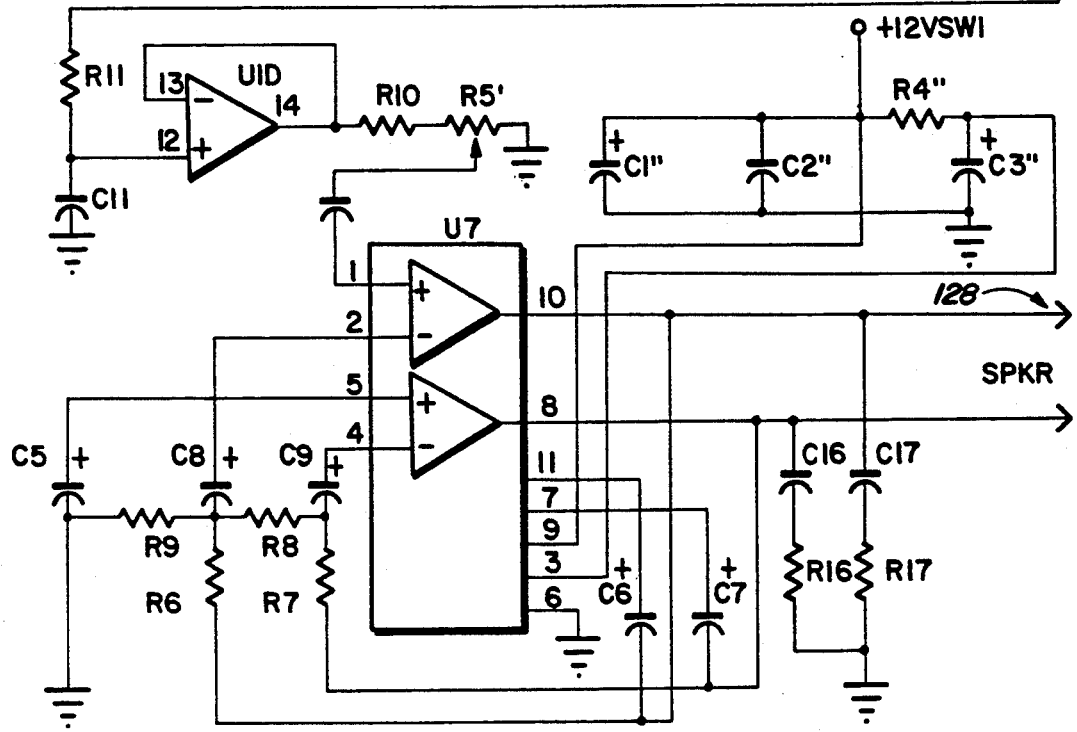
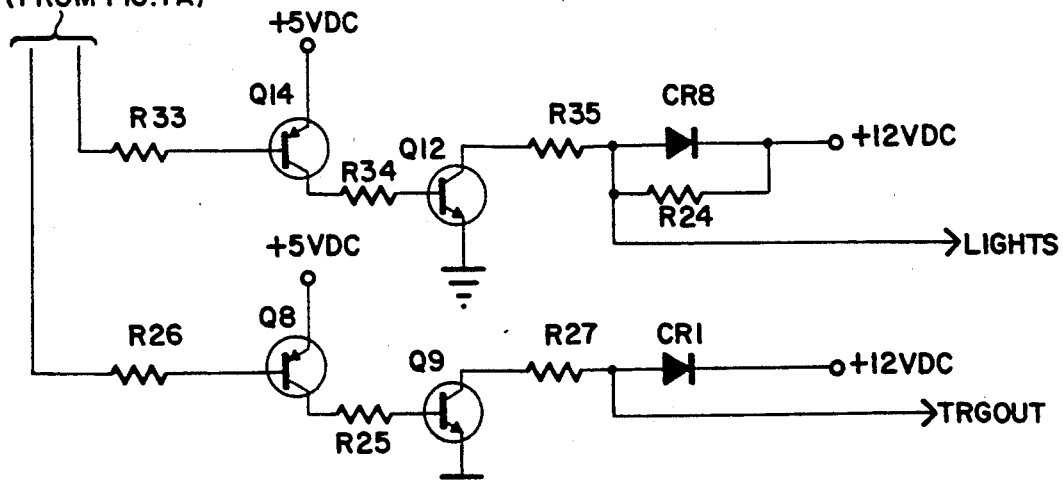
Fig. 7E

ALARM SYSTEM FOR SENSING AND VOCALLY WARNING A PERSON APPROACHING A PROTECTED OBJECT

This application is a continuation of patent application Ser. No. 07/610,402 filed Nov. 7, 1990, U.S. Pat. No. 5,117,217, which is a continuation of patent application Ser. No. 07/423,987 filed Oct. 11, 1989 U.S. Pat. No. 4,987,402 (hereaftter the '402 patent); which is a continuation-in-part of patent application Ser. No. 07/260,933 filed Oct. 21, 1988, U.S. Pat. No. 4,897,630 (hereafter the '630 patent); which is a continuation-in-part of patent application Ser. No. 07/005,873 filed Jan. 21, 1987, U.S. Pat. No. 4,794,368 (hereafter the '368 patent).

BACKGROUND OF THE INVENTION

The present invention relates to alarm systems, and more particularly to an alarm system that provides proximity detection in combination with vocal warnings generated electronically, e.g., by voice synthesis techniques. The alarm system advantageously senses any unauthorized approach towards a protected object, such as an automobile, motorcycle, or house, and vocally warns the person making the unauthorized approach to back away from the object before an alarm is sounded.

Alarm systems are known in the art. A typical alarm system is installed for the purpose of securing a defined area from unauthorized intrusion or trespass. The defined area that is secured by the alarm system will usually comprise a closed area, such as a specified room(s) within a building, or an entire building or house. In the case of automobile alarm systems, the secured area protected typically comprises the interior of the automobile, and may also extend to unauthorized tampering with the exterior of the automobile. However, no known systems extend to protecting an area or zone around a mobile object, such as vehicle; and of warning someone who intentionally or unintentionally enters this protected zone prior to sounding the alarm.

All alarm systems have certain basic elements in common. All include one or more sensors that are used to sense an entry event or other activity that could be viewed as an unauthorized tampering or presence (hereafter a "violation"). The sensor(s) are coupled, usually with electrical wires (although RF or other communication links may also be used), to a central control unit or equivalent circuit. When an entry or other activity is sensed by the sensor, an appropriate signal is sent to the control unit, which, if armed, generates an alarm signal. The alarm signal, in turn, may be used locally to sound an audible alarm, such as a loud siren or loud bell (intended to scare off the would-be intruder and to draw attention to the fact that an intrusion or other violation has been detected). The alarm signal may also be used to signal a remote location, such as a police station or a neighboring facility, of the violation that has been detected.

In the case of a simple automobile alarm system, the vehicle's existing electrical system (used, for example, to turn on a light when a door is opened) is used as a basic sensor that is connected to a control module. An alarm circuit within the control module is triggered whenever the monitored event occurs, such as when the door is opened. A siren or horn is sounded if too much time passes (typically 10 to 15 seconds) before the alarm system is turned off (disarmed).

More sophisticated automobile alarm systems supplement this basic alarm system with additional sensors (e.g., that sense the opening of the hood or trunk, the removal of an automobile cover, or the presence of "motion" within the vehicle) and a correspondingly more complex control module. Such systems may also include backup battery protection and remote paging capabilities. Further, it is not uncommon for such systems to take more preventative steps than merely sounding an alarm. For example, automobile alarm systems are known in the art that, upon sensing a violation (such as the opening of the door, trunk or hood while the system is armed), will disable the ignition and/or fuel delivery system of the automobile's engine, thereby rendering it impossible to drive the vehicle under its own power.

A feature common to all automobile alarm systems is the ability to selectively arm or disarm the system. A simple alarm system is armed after a prescribed time delay, such as 15 seconds, following the manual setting of an arming switch inside of the vehicle. (Typically, such switch is "hidden" or otherwise made non-conspicuous so that only the vehicle's owner knows of its location and function.) Once armed, all of the systems sensors are enabled and any entry or tampering event is interpreted as an unauthorized event or violation. The prescribed time delay subsequent to the arming of the system allows the vehicle owner sufficient time to exit the vehicle prior to the system becoming "armed". Similarly, upon reentering the vehicle, as mentioned above, another time delay allows the owner sufficient time to manually disarm the system before the alarm is sounded.

A major concern with existing automobile alarm systems relates to their cost, complexity of installation, and ease of maintenance verses their performance. To illustrate, a simple automobile alarm system (e.g., one that uses only the existing wiring of the automobile to sense the opening of a door and that sounds an alarm when unauthorized entry is detected) can be inexpensively manufactured and simple to install (and therefore quite affordable to the owner). Unfortunately, such a simple alarm system does not suit the needs, nor provide adequate protection, for many automobile owners. Therefore, most owners who want an alarm system will choose an alarm system that provides more protection and better suits their particular needs and vehicle.

Another concern associated with automobile and other type of alarm systems, e.g., house alarm systems, is that the sensors are designed to sense only a violation event that has already occurred, which event could (and usually does) involve some type of damage to the secured object, such as the breaking of a lock or the breaking of a windshield or other window glass. Thus, while the violation event is advantageously sensed by the alarm system, and the alarm is triggered by such event (which triggering of the alarm may scare the would-be intruder away from the area and/or signal others of the violation event), the violation event disadvantageously may cause damage or harm to the object being protected that must be repaired. What is needed, therefore, is an alarm system that not only senses a violation event, but that also detects when a violation event is about to occur so that a preliminary warning signal can be given in an attempt to protect against a would-be intrusion and prevent any damage before it occurs.

Because every application of an alarm system is somewhat unique, just as every make and model of automobile is somewhat different, and further because every owner of an alarm system is also different, and further because the needs of every owner change as a function of time and situation, there is no known universal alarm system, e.g., an automobile alarm system, that will suit the diverse needs of all owners at all times. Therefore, an owner must carefully shop around and try to select the alarm system that provides the best compromise given the owner's particular desires, needs and budget. See, e.g., "Auto Alarm Systems," *Consumer Reports*, October 1986, pp. 658–62. If the owner's needs or wants subsequently change, the only option available to the owner is to replace or upgrade the existing system with a new one that satisfies these new needs or wants. Such replacement and/or upgrading can be very bothersome and expensive, and in many situations is not practical.

Hence, what is needed, is a universal alarm system that can be efficiently and inexpensively manufactured, readily customized at installation to suit the particular needs of a particular owner, and easily modified thereafter to alter its performance. Such an alarm system can be used to protect an automobile, motorcycle, house, parking space, driveway or any other item of personal or real property, either by itself or in combination with existing alarm systems. Moreover, such an alarm system will include means for detecting not only a violation event (unauthorized entry or touching), but also an unauthorized approach towards the object or zone being protected.

SUMMARY OF THE INVENTION

The present invention addresses the needs identified above, as well as other needs, by providing an alarm system that combines a proximity detector and a unique control module to provide vocal alarm and reporting features. The proximity sensor is physically housed in a transceiver unit, which unit may be conveniently positioned on or in the object or zone to be protected. The control module is coupled to the transceiver unit through a suitable connecting cable, and may be located some distance from the transceiver unit, if desired. One or more speakers or other warning or signaling devices, e.g., headlights, may be connected to the control module, as is a suitable power source such as a battery.

The transceiver unit includes means for generating an invisible field that surrounds the unit. The proximity detector detects the presence of a human intruder in this field. By positioning the transceiver unit in or on the object or zone to be protected, e.g., on the dash or console of a vehicle, near a reserved parking space, etc., a protected zone or region is set up around the object or zone being protected. When an intrusion is sensed into this area, the circuits in the control module respond by issuing a preliminary warning that vocally informs the intruder that a protected region has been entered. This warning may be followed by a vocal count-down that gives the intruder ample time to move out of the protected area before the alarm is sounded. If, after the count-down has been completed (or after the expiration of a prescribed time period), an intrusion into the protected area is still sensed, the vocal alarm of the system is triggered and a violation event is recorded. The occurrence of this violation event can be immediately reported to the owner of the object or zone being protected, or to a designated law enforcement agency, using conventional communication techniques (e.g., a beeper, cellular telephone link, RF link, or equivalent communication link) and/or stored in the memory elements of the system for later reporting to the owner.

In operation, the present invention generates an adjustable, invisible field, e.g., an electromagnetic field, such as a radio frequency (RF) field, that surrounds the object to be protected. As used herein, "radio frequency" is intended to cover the frequency in the portion of the electromagnetic spectrum that is between about 10 KHz and 100,000 MHz, i.e. between the audio-frequency portion and the infrared portion. As such, the RF field generated by the invention includes a microwave field, where microwaves are defined as radio waves having a frequency greater than about 1 GHz. See, *IEEE Standard Dictionary of Electrical & Electronic Terms.* pp. 416, 553 (IEEE, 1977). When this field is penetrated, voice synthesis circuits within the system verbally warn the intruder of his or her presence and inform the intruder that an alarm will be triggered unless they step away from the object. If the intruder does not move out of the field, an additional vocal "warning" is generated, followed by a brief audible countdown. If the intruder steps away (out of the field), the countdown stops and the voice synthesis circuits say "THANK YOU!" If, however, the intruder remains in the field at the conclusion of the countdown, the alarm is triggered. The triggering of the alarm causes one or more voice messages to be generated that attract attention to the object being protected. These messages may include, for example, "PERIMETER VIOLATION!"; "I'VE BEEN TAMPERED WITH!"; and/or "SECURITY VIOLATION."

It is thus seen that the present invention, in addition to relating to alarm apparatus that performs the sensing and warning functions herein described, also relates to a method of protecting a prescribed object by notifying a person approaching the object, which person might inflict damage to the object, to back away from the object or else an alarm will be triggered. Advantageously, the voice synthesis technology used by the alarm system herein described may also be used to communicate to the owner the status of the system, e.g., whether the system is armed or disarmed, and whether and when a particular type of violation occurred. Such voice synthesis technology allows the alarm system to efficiently and effectively provide needed warnings when the zone around the protected object is violated, and to communicate to the owner. Moreover, when the system is used to protect a vehicle, use of vocal communication optionally permits the alarm system to utilize the existing components (e.g. speakers) of the vehicle's radio or tape player, thereby reducing the cost of the system. Alternatively, the alarm system may be a self-contained unit, including a speaker and power source, which unit can be placed by its owner near whatever object or property the owner desires to protect, such as a boat, a motorcycle, a house, or other object or area.

As with known alarm systems, the alarm system of the present invention comprises one or more sensors, a control module, and means for sounding an alarm should an unauthorized event be detected by the sensor(s). However, unlike known alarm systems, at least one sensor of the invention is a proximity detector, and a the control module of the invention includes a voice synthesizer. The combination of these two elements advantageously provides, in addition to the synthesized vocal speech warnings and reports indicated above, a degree of flexibility, programmability, and testability in the alarm system's installation, use, and operation that has heretofore been unavailable.

The proximity detector used as part of the present invention may be any type of sensor that can detect an intrusion into a designated area around the object to be protected. A preferred proximity detector is an RF proximity detector, although other types of proximity detectors are contemplated. The RF proximity detector includes means for generating an electromagnetic field around the object to be protected and means for sensing any disturbance to this field that is caused by a human intruder. Advantageously, the RF proximity detector includes adjustment means for setting the sensitivity so that human bodies can be distinguished from other types of bodies, such as animals (dogs, cats, and the like), and so that a desired range around the object being protected can be achieved.

The other elements of the alarm system of the present invention, including the electronic speech generation circuits, may be as disclosed in the '402, patent, the '368 patent and/or the '630 patent, which patents are incorporated herein by reference, or as known in the art.

A significant feature of the present invention is the ability to sense an intrusion into an area around the object being protected prior to the actual occurrence of a violation event (which violation event may result in damage to the object), thereby possibly frightening the would-be intruder away from the object and preventing damage thereto.

BRIEF DESCRIPTION OF THE DRAWINGS

The above and other advantages and features of the present invention will be more apparent from the following more particular description thereof, presented in conjunction with the following drawings wherein:

FIG. 1 is an outline of a typical passenger automobile, showing some of the key components therein that form part of an automobile alarm system of the type with which the present invention may be used;

FIG. 2 is a block diagram showing the control module of FIG. 1 being programmed to a desired configuration using an installer's programming device;

FIG. 3 is a perspective view of a one embodiment of a transmitter device that can be used to remotely interrogate and set the control module of FIG. 1;

FIG. 6 is an electrical schematic diagram of an indicating device that may be used in conjunction with the proximity sensor of FIG. 5 to signal that the sensor is on;

FIGS. 7A–7G are electrical schematic diagrams of the control module circuits of FIG. 4;

DETAILED DESCRIPTION OF THE INVENTION

Figure 4:
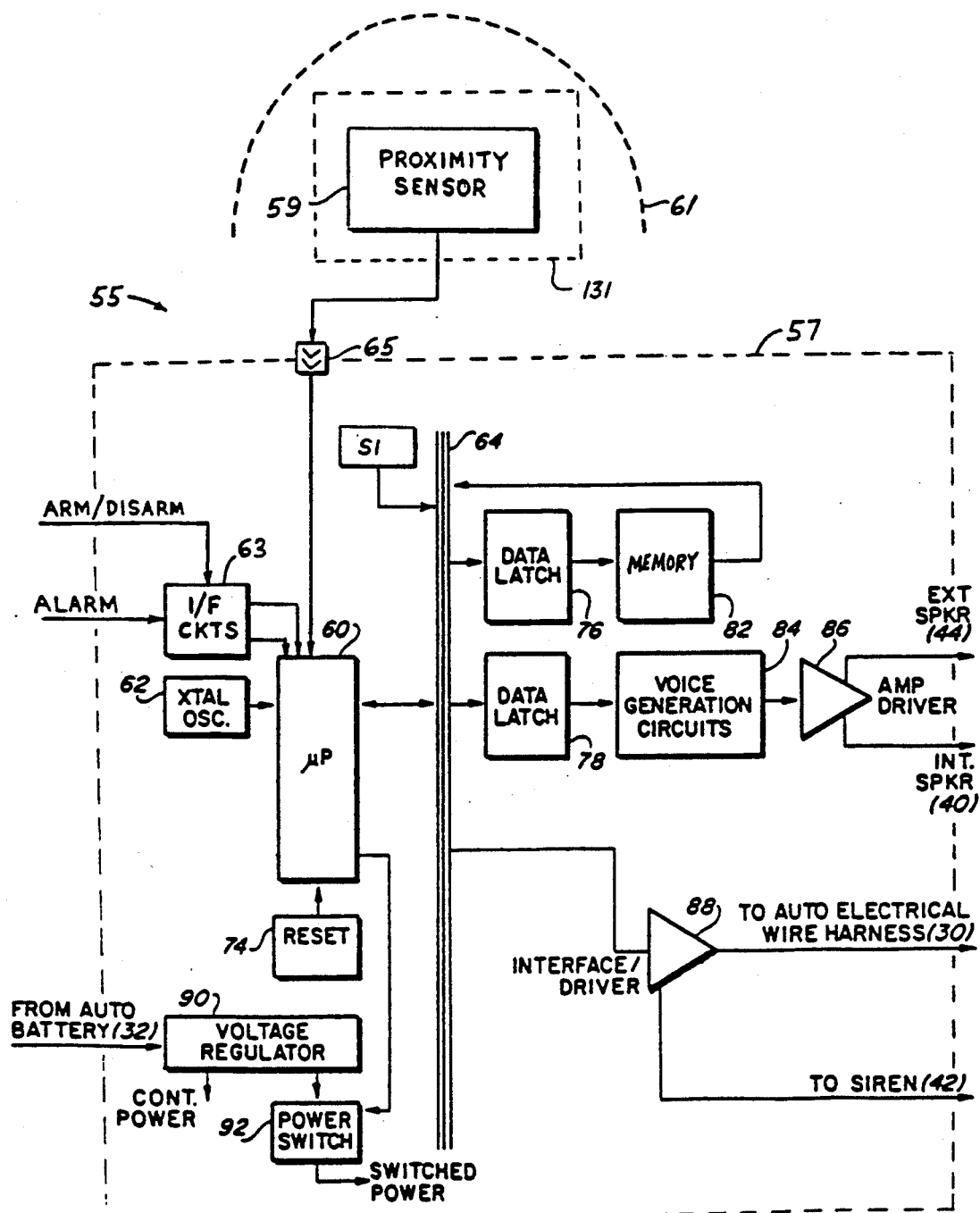
FIG. 4 is a block diagram of the control module of the self-contained embodiment of the present invention.

The following description is of the best mode presently contemplated of practicing the invention. This description is not to be taken in a limiting sense but is made merely for the purpose of describing the general principles of the invention. The scope of the invention should be ascertained with reference to the allowed claims.

Before describing the alarm system of the present invention, it will first be helpful to provide an overview of the alarm system and some of the features included therein. Basically, the alarm system utilizes an electronically generated "voice" that provides the user with a great deal of flexibility relative to the types of alarms and/or reports that may be generated. This voice is communicated through a conventional audio speaker. The "VOICE" thus generated can be programmed to operate in any desired language, or a combination of languages.

Advantageously, the alarm system senses any attempt to approach the object being protected. When an approach is sensed, the alarm system causes a voice warning to be given to the would-be intruder informing him or her that his or her presence has been detected and that he or she must step back from the object being protected. It is as though an invisible beam surrounds the object being protected. Any passage through this beam, as would be caused by an intruder approaching the object, is detected. For marketing purposes, this invisible beam is referred to as INVISIBEAM, and the alarm system may thus hereafter be referred to as the INVISIBEAM alarm system. (INVISIBEAM is a registered trademark of Electronic Security Products of California, Inc., assignee of the present application.) When a human body penetrates the beam, i.e., when a person enters the space around the object being protected while the alarm system is armed, a vocal warning is given. If the intruder does not move out of the protected field, an additional warning is issued followed by either additional verbal warnings and/or a brief audible countdown. If the intruder steps away, the countdown will stop and the system is reset. However, if the intruder remains within the field, an alarm may be triggered.

A preferred use of the present invention is to protect an automobile. Hence, in the description of the invention that follows, it is assumed that an automobile is the object being protected. However, it is to be understood that any object could be protected using the alarm system herein described, such as a boat, a motorcycle, a house, or the like.

Advantageously, several different operating modes of the system may be selected by the user at the time of installation. For example, if a "slow trigger" mode is selected, three vocal warnings are given by the alarm system when an intruder enters the protected field set up around the object. The first is: "WARNING, YOU'RE TOO CLOSE TO THE VEHICLE, STEP BACK!" The second is: "STEP BACK OR THE ALARM WILL SOUND!" The third is: "PERIMETER VIOLATION, FIVE . . . , FOUR . . . , THREE . . . , TWO . . . , ONE . . . " The alarm is triggered at the end of the countdown which forms part of the third message. During any of the messages, if the intruder moves away, the system responds with "THANK YOU" and the exterior lights of the vehicle will flicker. If the intruder does not move away within a prescribed time period, e.g., 15 seconds, after the first message, the second message is given. Similarly, if the intruder does not move away within a prescribed time period, e.g., 15 seconds, after the second message, the third message is given. If the intruder has not moved away at the conclusion of the countdown included in the third message, the alarm is triggered. During the third message countdown, the system only allows the intruder to go back into the protected field two times. On the third entry, the alarm immediately triggers without a verbal countdown, unless it occurs after a prescribed reset period, e.g. 15 seconds. If the intruder moves away during any of the messages for more than a prescribed period, e.g., 15 seconds, the system resets and starts at the beginning of the messages.

Other operating modes that may be programmably selected by the user at the time of installation (or thereafter, if a cover is removed and appropriate settings are mode on an internal DIP switch included within the control module), are explained more fully below.

Similarly, in a preferred embodiment, three modes of operation may be selected by the user at any time by setting a three position toggle switch. In a first position, MODE 1, the transceiver unit, and hence the proximity sensor is turned off, but any conventional alarm system being used with the proximity sensor continues to operate. In a second position, MODE 2, the transceiver unit, including the proximity sensor, is turned on, and the system functions as described herein, warning intruders of their approach to the protected object, requesting them to back away, and triggering the alarm if they do not back away. In a third position, MODE 3, the transceiver unit, includes the proximity sensor, is turned on, and the system functions as in MODE 2 except that the alarm is not triggered. In other words, MODE 3 is a "warning only" mode.

It is one of the more attractive features of the INVISIBEAM alarm system described herein to be usable with other conventional alarm systems. For example, most such conventional alarm systems, such as the VOCALARM system described in the '368 patent (VOCALARM is a registered trademark of Electronic Security Products of California, Inc.), include sensors for protecting all doors, windows, and motion of the vehicle. Such systems also include means for arming and disarming the system, as well as means for sounding an alarm, e.g., sounding a siren, honking the horn, or the like, in the event one of the sensors of the system senses a violation while the system is armed. Advantageously, the protection afforded by such systems may be utilized unimpaired when the INVISIBEAM system is employed. The INVISIBEAM system may be fully integrated into the conventional alarm system by being armed or disarmed using the same signals as does the conventional alarm system, and by using the same means for generating an alarm signal, e.g., the horn or lights, as does the conventional alarm system. Advantageously, however, when the INVISIBEAM system is enabled (i.e., while in MODES 2 or 3), it offers the further advantage of scaring away any would-be intruders from the automobile before they get close enough to the object being protected to trigger any of the conventional sensors used to protect the object. Keeping intruders away from the object in this manner prevents damage from being inflicted to the vehicle by the intruder, as might otherwise occur if the intruder forced open a door, or smashed a window, in an attempt to gain access into the object.

To better appreciate the manner in which the INVISIBEAM system of the present invention may be integrated with another type of automobile alarm system, reference is first made to FIG. 1. FIG. 1 shows an outline of a typical passenger automobile 12 and some of the key components thereof that form part of an alarm system used to protect it. These components include headlights 14, a horn 16, park lights 18, a hood sensor 20 (that senses the opening of the hood), a dome or other interior light 21, front door sensors 22 (that sense the opening of the front doors), back door sensors 24 (that sense the opening of the back doors), taillights 26, and a trunk sensor 28 (that senses the opening of the trunk). All of these components are electrically connected in conventional manner to the automobile's electrical wiring harness 30, which harness interconnects these components to the automobile's electrical system, including a battery 32.

In addition to these conventional components, standard on many models of automobiles, a representative automobile alarm system includes a control unit 34 that is also connected to the wiring harness 30. Connected to this control unit 34 are additional sensors, such as a motion sensor 36 (to sense motion within the interior of the automobile), and a microphone or glass sensor 38 (to sense striking or hitting of the automobile's glass windows). Other sensors (not shown) could also be connected to the control unit 34 as desired.

The particular alarm system shown in FIG. 1 is the type of alarm system described in the '368 patent, and includes means for generating vocal alarms and reports. The INVISIBEAM system of the present invention may be used with the alarm system described in the '368 patent, or with any type of automobile alarm or other alarm system, as desired. That which is shown in FIG. 1 is thus merely representative of an automobile alarm system.

As shown in FIG. 1, the control unit 34 is also connected to the automobile's internal speaker(s) 40, an external siren 42, and an external speaker 44. These components, as has been discussed, provide additional flexibility in the type of alarms and status signals and reports provided by the alarm system.

For the particular alarm system embodiment shown in FIG. 1, the owner/operator controls and interrogates the control unit 34 through use of an interior menu control pad 40 that is directly connected to the control unit 34. Alternatively or conjunctively, another control/interrogation path is provided through an RF receiver 50 (which receives control or interrogate signals 52 from an external transmitter 54). A status light 46, connected to the control unit 34, provides a visual indication to the owner/operator that the alarm system is powered on. In some embodiments, a paging unit 56 may optionally be connected to the control unit 34 to provide remote paging capabilities should a violation be detected. Such paging unit 56 transmits a prescribed signal, through antenna 58, to a remote receiver (not shown) in order to signal the alarm condition. The remote receiver is typically carried by the owner and emits a beeping sound when being paged, thereby notifying the owner that a violation has occurred. More sophisticated remote receivers may be connected to a telephone circuit and provide the capability of automatically dialing a prescribed sequence of telephone numbers in order to alert at least one remote location of the sensed alarm condition.

Details concerning the operation and circuits of the control unit 34 used with the alarm system of FIG. 1 are found in the '368 patent, and will not be repeated herein. Essentially, as with many modern automobile alarm systems, the control unit 34 includes a microprocessor that is programmed to monitor each sensor and respond in an appropriate fashion by sounding a desired alarm, or combination of alarms, when any sensor event indicates a violation event has occurred while the alarm system is armed. The alarm system described in the '368 patent further includes the option of providing vocal reports and menus to the user, thereby providing, in a cost-effective manner, information concerning the occurrence of past violation events, as well as added flexibility in how the system is configured and operated.

An important feature of any alarm system is the ability to configure the alarm system at installation to suit the needs and desires of a particular owner for his or her particular automobile or other object being protected. The particular alarm system described in connection with FIG. 1 achieves this flexibility by loading into the memory circuits of the microprocessor, during installation of the system, the particular control data needed in order to provide the desired operating configuration. FIG. 2 is a block diagram that illustrates how this is done. During installation, i.e., after all of the alarm system components have been installed in the vehicle, a programming unit 105 is plugged into a connector 72 that interfaces with the control unit 34. This connector 72 may be the same connector used to connect the receiver 50 to the control unit 34. Thus, it is a simple matter for the installer to disconnect the receiver 50 from the plug 72 and to connect the programmer unit 105 thereto.

The programmer unit 105 includes a keyboard 107 and a display 109. Upon turning the system on, a series of menus are displayed on the display 109 that provides to the installer a list of all of the available options and configurations that can be programmed into the system. The installer merely selects the desired item from the menu list by pushing a designated key on the keyboard 107. After all of the menus have been displayed and the desired selections have been made and verified, instructions are displayed on the screen that enable the installer to enter the desired options into the memory of the control unit 34. These instructions provide for simple key stroke entries that carry out the desired command.

Referring next to FIG. 3, a perspective view of a portable transmitter 54 is shown. This transmitter may be used with the alarm system shown in FIG. 1. The transmitter 54 is small enough to be carried on a key chain 96, and is not any larger than a typical automobile ignition key 98 (approximately two inches square and less than ½ inch thick). It is the function of the transmitter 54 to allow the owner/operator a means of controlling or interrogating the alarm system from a location external to the automobile. Primarily, the portable transmitter 54 is used for arming and disarming the system from an external location. When the system is armed or disarmed in this manner, a vocal confirmation of such arming or disarming is provided through the external speaker 44 so that the owner/operator has positive verification that proper arming or disarming has occurred.

In accordance with the teachings of the present invention, a self-contained alarm system 55, i.e., the INVISIBEAM system of the present invention, may be coupled to the control unit 34 of the automobile alarm system shown in FIG. 1. The INVISIBEAM alarm system 55 advantageously supplements the performance of the regular alarm system by providing proximity detection and vocal warning in the event an intruder enters into an electromagnetic field that the system 55 sets up around the automobile (or other object being protected). The sensing functions of the regular system remain unimpaired and fully operational even though the INVISIBEAM system is employed. Advantageously, the transceiver unit of the INVISIBEAM system may be selectively positioned within the vehicle, such as near the centerline of the vehicle, where it can best "see" around the vehicle. The control module portion of the INVISIBEAM system may then be positioned in a suitable out-of-the-way location, such as under the dash, seat or in the trunk area. Detachable connectors and an attractive, ruggedized case facilitate the placement of the INVISIBEAM transceiver within or on the vehicle in a convenient location. It should be noted that while the INVISIBEAM system 55 is shown in FIG. 1 as being connected directly to the control unit 34, it is to be understood that other means could also be used to effectuate this connection. For example, the system 55 could be coupled to the control unit 34 through an optical link, or through an RF link established through the receiver 50.

A block diagram of the INVISIBEAM system 55 is shown in FIG. 4. The system includes a proximity sensor 59 and a control module 57. The proximity sensor 59 senses when a human body or other large mass comes within a specified range thereof. This range is indicated by the dotted line 61, which line defines a field that is set up around the sensor 59. (Hereafter, the area inside of the line 61 may be referred to as the field 61.) Advantageously, as will be explained more fully below, the size of the field 61 may be easily adjusted by the user of the INVISIBEAM system to meet the needs of the user at any given time.

Also shown in FIG. 4 is a simplified block diagram of the INVISIBEAM control module 57. Although simplified, FIG. 4 contains sufficient detail to enable one to gain an overview and basic understanding of how a microprocessor 60 functions as the control unit for the INVISIBEAM alarm system shown. In this regard, it should be noted that many of the operational details associated with the INVISIBEAM system 55, which is essentially a microprocessor-based system, are very similar to the circuit design and operation of the control unit 34 of the vocal alarm system described in the '368 patent, also a microprocessor-based system. Accordingly, reference can be made to the '368 patent for such details.

As indicated in FIG. 4, at the heart of the control module 57 of the INVISIBEAM system 55 is a microprocessor circuit 60. A microprocessor circuit may be thought of as simply a digital processing circuit that receives and processes digital data according to a prescribed sequence. The processing sequence is defined by a "program", which program is stored in some appropriate memory device. The microprocessor circuit 60 is programmed to monitor the proximity sensor 59, as well as any control or other signals received from any other sources, such as the arm/disarm signals that may be generated in any conventional manner external to the system 55, or the alarm signal that another alarm system (with which the INVISIBEAM system 55 is used) generates. The microprocessor program defines a prescribed response, such as the sounding of a vocal warning message, when an entry into the protected region around the sensor 59 (i.e., a penetration into the field 61), is detected. Advantageously, programming of the INVISIBEAM system may be set by the user and/or installer by simply setting appropriate switches included in the switch S1. In some embodiments, the microprocessor circuit 60 may be further programmed to store the time that an alarm is triggered as a result of an unauthorized entry into the field 61 (note that an alarm is triggered only when the intruder does not exit the field as instructed), so that such information may be subsequently provided to the owner/operator in a vocal or other report. In one embodiment, the time of any sensed penetration into the field 61, even if the intruder subsequently exits the field 61, may be recorded and subsequently provided in a vocal or other report.

As shown in FIG. 4, the microprocessor circuit 60 is clocked by a master clock signal derived from a crystal oscillator circuit 62. This clock signal is used to control all the intricate data processing operations that occur within the microprocessor circuit 60. Digital data is sent to and received from the microprocessor circuits over data bus 64. Arm or disarm control signals, as well as alarm event signals, are passed to the microprocessor 60 via suitable interface (I/F) circuits 63. The proximity sensor 59 is detachably coupled to the microprocessor 60 through a suitable connector 65.

Further connected to the microprocessor 60 is reset circuitry 74. It is the purpose of this reset circuitry 74 to reset the microprocessor 60 to a desired operating mode in the event of a power interruption or other condition that might adversely affect the microprocessor's operation.

The data bus 64 is further connected to two output data latch circuits, 76 and 78. It is the function of these latch circuits to receive the data that appears on the data bus 64 at a particular moment in time and hold this data for subsequent presentation to a desired output circuit. Output data latch 76, for example, presents its latched data to Memory circuit 82. This Memory circuit 82, in turn, presents selected data stored therein back to the data bus 64 (from which point the data may be directed, through operation of the microprocessor or latch circuits, to other selected destinations within the system 55.) It is noted that the operating programs of the microprocessor 60 may be stored in Memory 82.

Similarly, output data latch 78 presents its latched data (obtained from data bus 64) to the voice generation circuits 84. In order to allow a larger vocabulary of synthesized speech, additional memory, such as read-only memory (ROM), may be used as part of the voice generation circuits 84 in order to provide stored data representative of voice signals to the voice generation circuits 84. These voice generation circuits convert the digital data to analog data representative of vocal speech. The resulting speech signals are then amplified in amplifier/driver circuits 86 and directed to the appropriate internal or external speakers.

Selected data appearing on the data bus 64 may also be presented to interface/driver circuit 88. This interface/driver circuit 88, in turn, amplifies and buffers the received data signal(s) as required prior to presenting it to an appropriate alarm device, such as the automobile's wire harness 30 (which, in turn, is connected, e.g., to the horn and lights), or to an external siren 42, or equivalent device, which devices may be used in conjunction with the vocal messages generated by the system when an alarm is triggered.

As is also shown in FIG. 4, the INVISIBEAM control module 57 includes a voltage regulator 90. Voltage regulator 90 receives raw input power from the automobile's battery 32, or other external power source, and converts this unregulated power to the appropriate voltage levels needed throughout the INVISIBEAM system 55 in order to properly operate the various circuits used therein. Power switch 92 advantageously provides a switched power output line that is directed to most of the alarm circuits (e.g., the voice generation circuits 84, the voice amplifier/driver circuits 86, and the interface/driver circuits 88). These alarm circuits do not need to be turned on until an unauthorized penetration into the field 61 is detected. Hence, by operation of the power switch 92, no power is presented to such circuits until needed, thereby conserving power. Other circuits, such as the proximity sensor 59, need to receive power only when the alarm system is armed. In contrast, other circuits, such as the microprocessor circuit 60 and the interface circuits 63, need continuous power because such circuits need to be active at all times. However, it is noted that these active circuits consume very little power, largely because the microprocessor circuit 60 and associated logic circuits are realized with low-power-consumption CMOS (complementary metal oxide semiconductor) integrated circuits, and the proximity sensor 59 consumes little power when the INVISIBEAM system is armed.

From the above description, the basic operation of the alarm system can now be better understood and appreciated. To summarize this operation, a controlling program for the microprocessor is initially stored in Memory 82. When the alarm system is turned on, the microprocessor circuit 60 looks to the Memory 82 for its operating program. When the alarm system is armed, e.g., by receipt of an appropriate arm signal through the interface circuit 63 (which arm signal may be the same arm signal used to arm a conventional alarm system with which the INVISIBEAM system is used), the operating program causes the microprocessor to continuously monitor the proximity sensor. Any penetration into the field 61, as sensed by the proximity sensor, is sensed by the microprocessor 60. The microprocessor responds, as controlled by its operating program, by generating a warning signal or message that instructs the intruder to back away from the object. If the intruder backs away out of the field 61 as instructed, the INVISIBEAM system responds by generating a vocal "THANK YOU" and by flickering the lights of the automobile. If the intruder does not back away, further warning messages are issued, ultimately resulting in an alarm being triggered. The microprocessor stores a data signal indicating the time at which the alarm was triggered, so that such event may be subsequently reported to the owner of the system.

The type of warning or alarm that is sounded and its duration is controlled by the program and any operating options that may have been selected by the owner/operator through use of the various control switches that are included as part of the switch S1 or equivalent device. For example, in the preferred embodiment, the switch S1 includes a DIP switch having eight individual switches that can be set by the user or installer at the time the system is first installed, or subsequent to installation if the cover of the control module is removed. Further, a three position toggle switch is included which the user can set at any time. The three position toggle switch defines three modes of operation. In a first mode, MODE 1, the INVISIBEAM system is off, but any conventional alarm system used with the INVISIBEAM system remains fully operational. MODE 1 might be selected, for example, when the object is placed in a congested area where it is expected that many people will pass within the field 61. In a second mode, MODE 2, the INVISIBEAM system is fully operational. In a third mode, MODE 3, the INVISIBEAM system provides vocal messages instructing any sensed intruder into the field 61 to back away, but no alarm is ever triggered. MODE 3 might be selected, for example, for demonstration or testing purposes.

As presently configured, the eight switches included in the DIP switch 51 provide the following options. If a first DIP switch is ON, the system generates a vocal "ARMED" when the alarm system is turned ON and "DISARMED" when the alarm system is turned OFF. If the INVISIBEAM system is used in conjunction with the vocal alarm system described in the '368 patent, this DIP switch would be turned OFF as the vocal alarm system already generates "ARMED" and "DISARMED" messages.

A second DIP switch, if ON, provides a rotation of three voice messages whenever the alarm is triggered. As presently contemplated, these messages are: (1) "VEHICLE SECURITY VIOLATION"; (2) "I'VE BEEN TAMPERED WITH"; and (3) "PERIMETER VIOLATION". Some alarm systems already provide for the rotating of broadcast messages, such as the system described in the '368 patent, and if the INVISIBEAM is used with such a system, this second DIP switch could be turned OFF.

A third DIP switch provides for a unique siren sound that is broadcast through the speaker that forms part of the INVISIBEAM system when the alarm is triggered. Three different siren sounds are heard, one sound per alarm sequence. Use of this option allows other sirens, e.g., as part of a conventional alarm system, to be disabled or eliminated.

A fourth DIP switch, if ON, provides a five second delay from the time an armed signal is received before the system is actually armed. This delay allows the user a known time to get out of the field 61 if arming must take place while in the field 61. If OFF, a thirty second delay is provided.

A fifth DIP switch, if ON, provides a "fast trigger" mode. This mode is useful, for example, where the object being protected is a convertible automobile, and a fast trigger is desired to prevent a quick entry into the field 61 and into the vehicle. While in the fast trigger mode, if penetration into the field 61 is sensed, only one message is heard: "WARNING, YOU'RE TOO CLOSE TO THE VEHICLE, STEP BACK OR THE ALARM WILL SOUND!" If the intruder steps back, the system responds with "THANK YOU." If at the end of a prescribed period, e.g., 15 seconds, the intruder has not stepped back, the alarm triggers.

If the fifth DIP switch is OFF, a "slow trigger" mode is provided. Such slow trigger mode is applicable to most automobiles. In the slow trigger mode, a penetration into the field 61 causes a first message to be generated: "WARNING, YOU'RE TOO CLOSE TO THE VEHICLE, STEP BACK!" If the intruder moves away within a prescribed time, e.g., 15 seconds, the system responds with "THANK YOU!" If the intruder does not step away within the prescribed time, a second message is generated: "STEP BACK OR THE ALARM WILL SOUND!" Again, if during the prescribed time the intruder steps back, the system says "THANK YOU!" However, if after the prescribed time the intruder remains in the field 61, a third message is generated: "PERIMETER VIOLATION, FIVE . . . , FOUR . . . , THREE . . . , TWO . . . , ONE." At the conclusion of the countdown, the alarm is triggered. During any of the messages, if the intruder moves away, the system responds with "THANK YOU" and the exterior lights of the automobile flicker. If the intruder remains within the field 61 for the prescribed time period, the next message is generated, unless the message is the last message, in which case the alarm is triggered. During the third message countdown, the system is programmed to only allow the intruder back into the field 61 a fixed number of times, n, where n is an integer. On the (n+1)th entry into the field, the alarm immediately triggers without a verbal countdown, unless it is after the prescribed second reset period, e.g., 15 seconds, in which case the INVISIBEAM system resets and starts at the beginning of the messages. In a preferred embodiment, n is equal to two.

A sixth DIP switch, if ON, activates a test mode. Since the field 61 is not visible, the user can use the test mode to sense the boundaries of perimeter field 61. During this test mode, the user can move around the object. If within the field 61, the system repeatedly generates "STEP BACK". If the user steps out of the field 61, no message is generated. Thus, by selectively positioning the sensor 59, and by adjusting the size of the field using a manual adjustment that is provided, the size of the field can be set to the size that best suits the needs of the user. Once the boundaries of the field 61 have been set as desired, the sixth DIP switch is turned OFF.

The seventh and eighth switches in the DIP switch are available as spares for use with future options that may be programmed into the INVISIBEAM system.

In a typical operating mode, the microprocessor program continues the "alarm sounding" for only a prescribed period of time, such as 60 seconds. When the owner/operator returns and disarms the system, a vocal report is generated informing the owner/operator through the external and/or internal speakers of the time at which the penetration event occurred. Such vocal report is generated in the same manner as was the vocal alarm, i.e., the microprocessor places the appropriate data signals on the data bus 64. This data is then latched into output data latch 78, and the voice generation circuits then act on this data in order to generate the desired speech signals therefrom.

Figure 8:
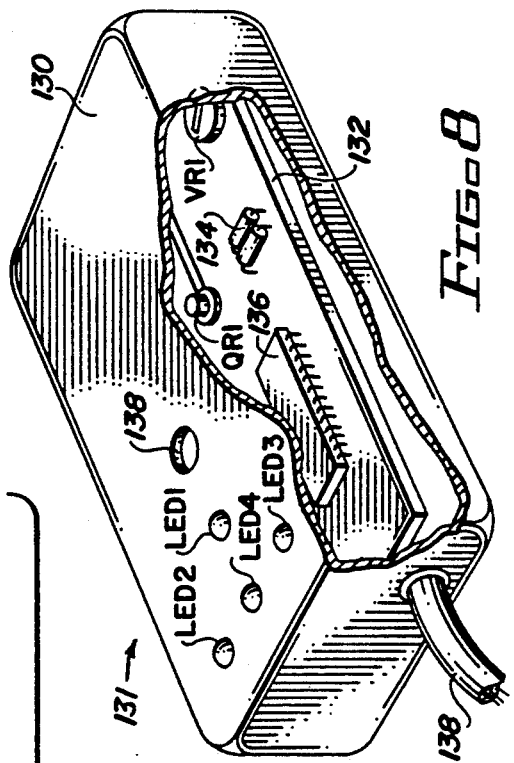
FIG. 8 is a cutaway perspective view of a case wherein the circuits of FIGS. 5 and 6 may be housed.

As indicated, the INVISIBEAM alarm system includes a control module 57 and a transceiver. The transceiver includes the proximity sensor 59 and the circuits used to generate the field 61, as well as appropriate display circuits that visually indicate that the system is armed and "looking" for any entry of an intruder into the field 61. The control module 57 includes the remainder of the circuits shown in FIG. 4. Also included with the INVISIBEAM system, and not shown in FIG. 4, is a three position toggle switch and a voice speaker, including the cables and connectors needed to interconnect these components. The transceiver, which is shown in FIG. 8, is housed in a suitable case and is designed to be positioned in or on the object being protected, such as on the center console, dash, or rear deck lid inside of a vehicle to be protected. The speaker is preferably mounted in the engine compartment. The control module is mounted in any suitable location inside of the vehicle, preferably where it is protected from moisture. For use with an automobile, all that is required to operate the system is to interconnect the elements with appropriate cables, and connect the battery of the vehicle to the control module. If used with another alarm system, the appropriate ALARM and ARM/DISARM signals from the other alarm system are also be connected to the control module.

Figure 5:
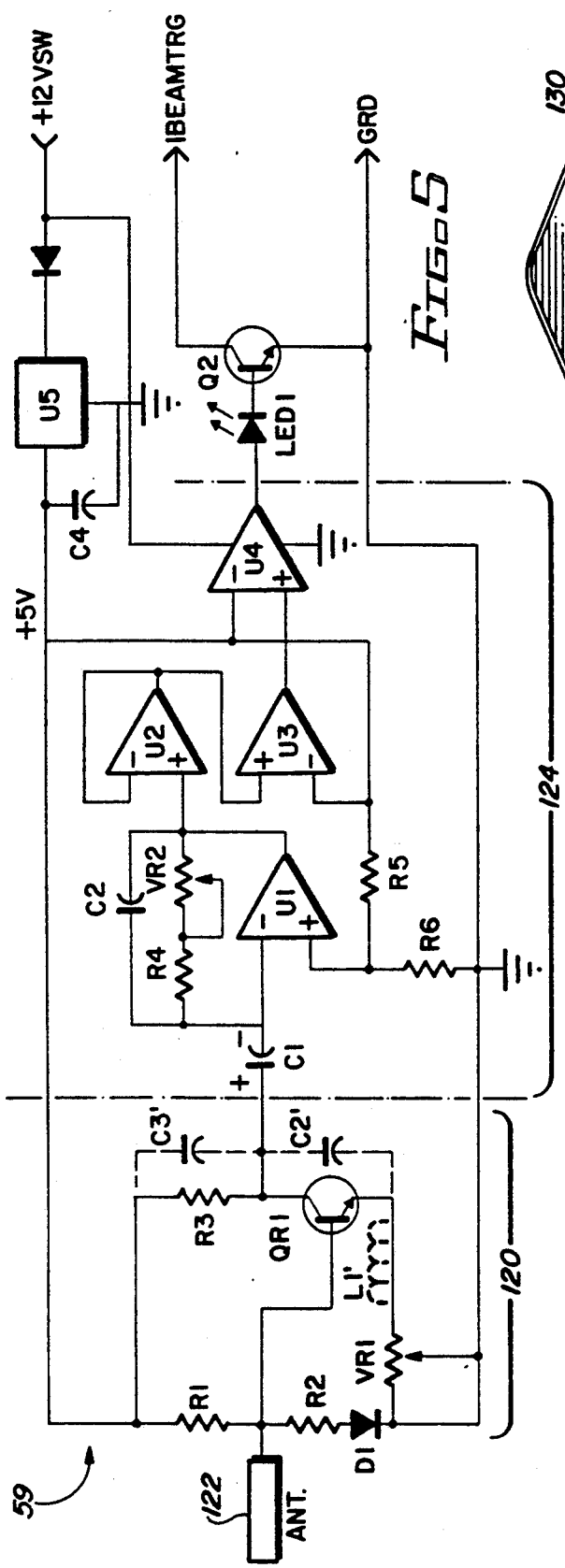
FIG. 5 is an electrical schematic diagram of the proximity sensor used in FIG. 4.

Referring next of FIG. 5, an electrical schematic diagram of the sensor 59 is shown. This sensor includes a radio frequency (RF) oscillator 120 comprising an RF transistor QR1 biased for oscillation in a conventional manner. In a preferred embodiment, the transistor QR1 is a BFR 90 transistor, commercially available from several semiconductor manufacturers. The frequency of oscillation is 2.45 GHz (microwave frequency range). At this microwave frequency, the inductance L1' (shown in phantom), and capacitance C1' and C2' (also shown in phantom) associated with the leads of the transistor and the connections made to the other circuit components, play a significant role in its operation. The inductance L1', for example, serves as an antenna that causes the RF signal generated by the transistor to propagate in the field surrounding the transistor. A portion of this propagated RF signal is picked up by the antenna 122 connected to the base of the transistor, thereby providing positive feedback that reinforces the circuit's oscillatory mode. The antenna 122 is realized with a 1 oz. copper strip, 3 mm wide, and 18 mm long, that is placed around the edge of the circuit board on which the RF oscillator circuit is placed. A variable resistor VR1, placed in the emitter of the transistor QR1, provides a convenient adjustment for adjusting the intensity of the resulting microwave signal, and hence the effective size of the field 61 that is created by the propagating RF signal.

The output signal appearing at the collector of RF transistor QR1 is connected to an integrator circuit 124. The integrator circuit 124 includes four operational amplifiers, U1, U2, U3 and U4, each of which may be ¼ of an LM 324D quad operational amplifier integrated circuit. The first operational amplifier is configured as an integrator, having a bias potential applied to its non-inverting input (set by the voltage divider network made up of resistors R5 and R6, with resistor R5 being connected to +5 volts and resistor R6 being connected to ground), and having the RF output signal applied to is inverting input through a coupling capacitor C1. A feedback network includes a resistive path in parallel with a capacitive path, in a conventional integrator configuration. The resistive path is made up of resistor R4 in series with variable resistor VR2. The capacitive path includes capacitor C2.

Amplifier U2 is configured as a non-inverting unity-gain, buffer amplifier for the output of the integrator made up of amplifier U1. The output of U2 is coupled to the non-inverting input of amplifier U3. The inverting output of amplifier U3 is connected to +5 volts, as is the inverting input of amplifier U4. The output of amplifier U3 is connected to the non-inverting input of amplifier U4. In series, the amplifiers U1–U4 thus comprise an inverting integrator circuit, the inversion occurring in the first or U1 stage. A light emitting diode, LED1, is connected between the output of U4 and the base terminal of a transistor switch Q2. When the output of U4 goes high, current flows through LED (causing it to emit light), and transistor switch Q2 is turned ON.

A voltage regulator U5, realized, for example, with a 78L05, converts the +12 volt power obtained from the control module to the +5 volt power needed for operation of the RF oscillator and for the various reference potentials used by amplifiers U1, U3 and U4. Note that the amplifiers U1–U4 are powered by +12 volts;, thus, a +5 volt bias signal, such as is present at the inverting inputs of amplifiers U3 and U4, and which is approximately present at the non-inverting input of amplifier U1, is more or less in the center of their operating range.

In operation, RF oscillator 120 generates an RF signal that is propagated throughout the field 61 surrounding QR1. The output signal from the RF oscillator varies in magnitude as a function of the amount of the signal that is picked up by the antenna 122 and fed back into the circuit. The amount of the signal that is picked up by the antenna is, in turn, a function of whether a large body mass is present in the RF field, and whether that large body mass is deflecting, absorbing, or otherwise interfering with the propagated RF field. If, for example, a large body mass is not present, the amount of signal that is fed back into the oscillator 120 causes the output signal of the RF oscillator to assume a first value. This value is integrated in the integrator 124. The integrator 124, in effect, measures the energy of the output signal from the RF oscillator. A large signal (one having a high energy content) causes the output of the integrating circuit, comprising amplifiers U1–U4, to assume a low value if the energy exceeds a set threshold level. This threshold level is set by the variable resistor VR2 and the bias voltage set by the resistors R5 and R6. A smaller signal (one having a lower energy content) causes the output of the integrating circuit to assume a high value as soon as the energy level drops below the threshold level. If a large body mass is present within the RF field, much of the energy associated with the field may be absorbed in the body or reflected away from the antenna, thereby causing the output signal from the RF oscillator 120 to change. If properly adjusted, this change in the output signal will cause the integrator output, present at the output of amplifier U4, to go from a low level to a high level, or from a high level to a low level. Particularly if the large body mass is moving in the RF field. This movement will be sensed as variations in the output of amplifier U4. Such variations cause LED1 to turn on and off (thereby signaling that there has been a change in the field, e.g., a large body mass has entered and is moving within the field), and further turns transistor Q2, on and off which turning on or off signals the control module 57 that an entry has been sensed into the RF field 61. Small changes in the RF field such as might be caused by a small body mass, e.g., an animal, do not cause Q2 to turn on and off because the integrator (which acts as a filter) renders the system insensitive to such changes. Large changes in the field, on the other hand, such as are caused by a human mass, do cause Q2 to turn off and on, thereby signalling that an entry into the field has occurred. Note that the transistor switch Q2 is an "open collector" switch, meaning that the collector of the transistor is connected to the control module in conventional logic signal fashion. Thus, an open collector (Q2 off) indicates one logic state (no person present in the field), and a closed collector (Q2 on) indicates the other logic state (person present in the field).

Preferred values for the resistors and capacitors used in the sensor 59 shown in FIG. 5 are as follows (where the resistance values are expressed in ohms, and the capacitor values are expressed in microfarads): R1 2.2K; R2 82; R3 500; VR1 100; C1 22; C2 0.1; R4 200K; VR2 500K; R5 1K; R6 10K; C4 4.7. The transistor switch Q2 is realized using an MPS AO5 NPN transistor; although any suitable switching transistor could be used.

Figure 6:
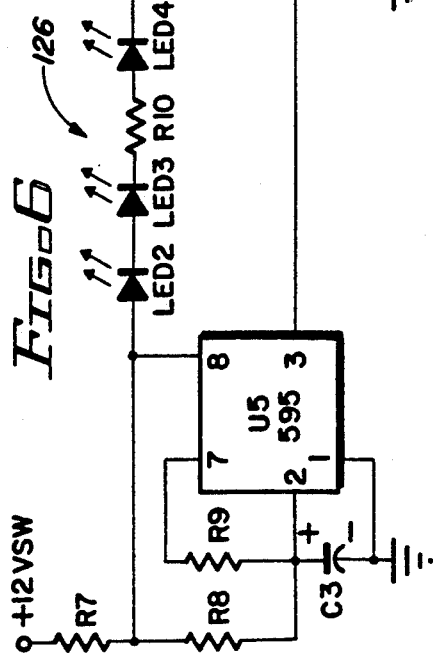

Referring next to FIG. 6, an electrical schematic diagram of one type of indicating circuit 126 is shown. The circuit 126 is placed in the transceiver with the sensor 59. The purpose of the indicating circuit 126 is to provide a visual indication that the sensor is armed and is monitoring the RF field in order to detect the entry of any person (intruder) into the field. The circuit includes an appropriate shift register or counting circuit that is configured to operate as astable multivibrator, i.e., an oscillator that assumes a first state for a fixed time, followed by assuming a second state for another fixed time, after which it reverts back to the first state. In the first state, light emitting diodes LED2 and LED3 are turned on. In the second state, light emitting diode LED4 is turned on. Thus, as the circuit toggles back and forth between its two states, the light emitting diodes also toggle on and off.

It is noted that the power presented to the transceiver circuits shown in FIGS. 5 and 6 is identified as +12 VSW, meaning that it is the switched twelve volt power supply from the vehicle battery. In this context, "switched" refers to "armed". Thus, whenever the alarm system is armed, the +12VSW power is present, thereby causing the proximity sensor 59 and the indicating circuit 126 to be on and operating.

Referring next momentarily to FIG. 8, a perspective view of the transceiver of the INVISIBEAM system of the present invention is shown. The transceiver, as has been indicated, includes both the proximity sensor 59 and the indicating circuit 126. A suitable case 130 houses a circuit board 132 upon which the circuit components, such as resistors 134, capacitors, dual-in-line packaged (DIP) integrated circuits 136, and the like, of the sensor 59 and the indicating circuit 126 are mounted. The RF transistor QR1 is mounted in a prominent location near the center of the circuit board 132. A single cable 138 connects the transceiver to the INVISIBEAM control module 57. This cable 138 carries the +12VSW power to the transceiver, and also carries the IBEAMTRG signal (from the open collector of transistor Q2 of the sensor 59) to the control module. The IBEAMTRG signal is the trigger signal that indicates the presence of a large body mass has been detected within the protected field. LED1, which in a preferred embodiment is green in color, is centrally mounted on the case 130. When ON, LED1 (green) indicates that the presence of a large body mass in the RF field 61 has been detected. LED2 and LED3, both red in the preferred embodiment, are positioned on each side of LED4, which is yellow. LED2 and LED3 are ON simultaneously while LED4 is OFF. When LED4 is ON, LED2 and LED3 are OFF. This toggling of LED2, LED3 and LED4, from red to yellow and yellow to red, visually alerts any person who can see the transceiver cover that the transceiver is armed and "looking" for any person who might enter into the protected field. An access hole 138 provides a convenient means for adjusting VR1, which adjustment sets the sensitivity of the INVISIBEAM system by adjusting the strength of the RF field. In contrast, VR2, which sets the time constant associated with the integrator 124, is generally not adjustable unless the cover 130 is removed from the transceiver.

Reference is next made to FIGS. 7A through 7G wherein electrical logic schematic diagrams of the preferred control module 57 for the INVISIBEAM system are shown. The control module 57 includes all the circuits shown in the block diagram of FIG. 4 with the exception of the proximity sensor 59. Hence, in briefly describing FIGS. 7A through 7G below, frequent reference will also be made to the circuits and corresponding reference numerals of the block diagram of FIG. 4.

Figure 7A:
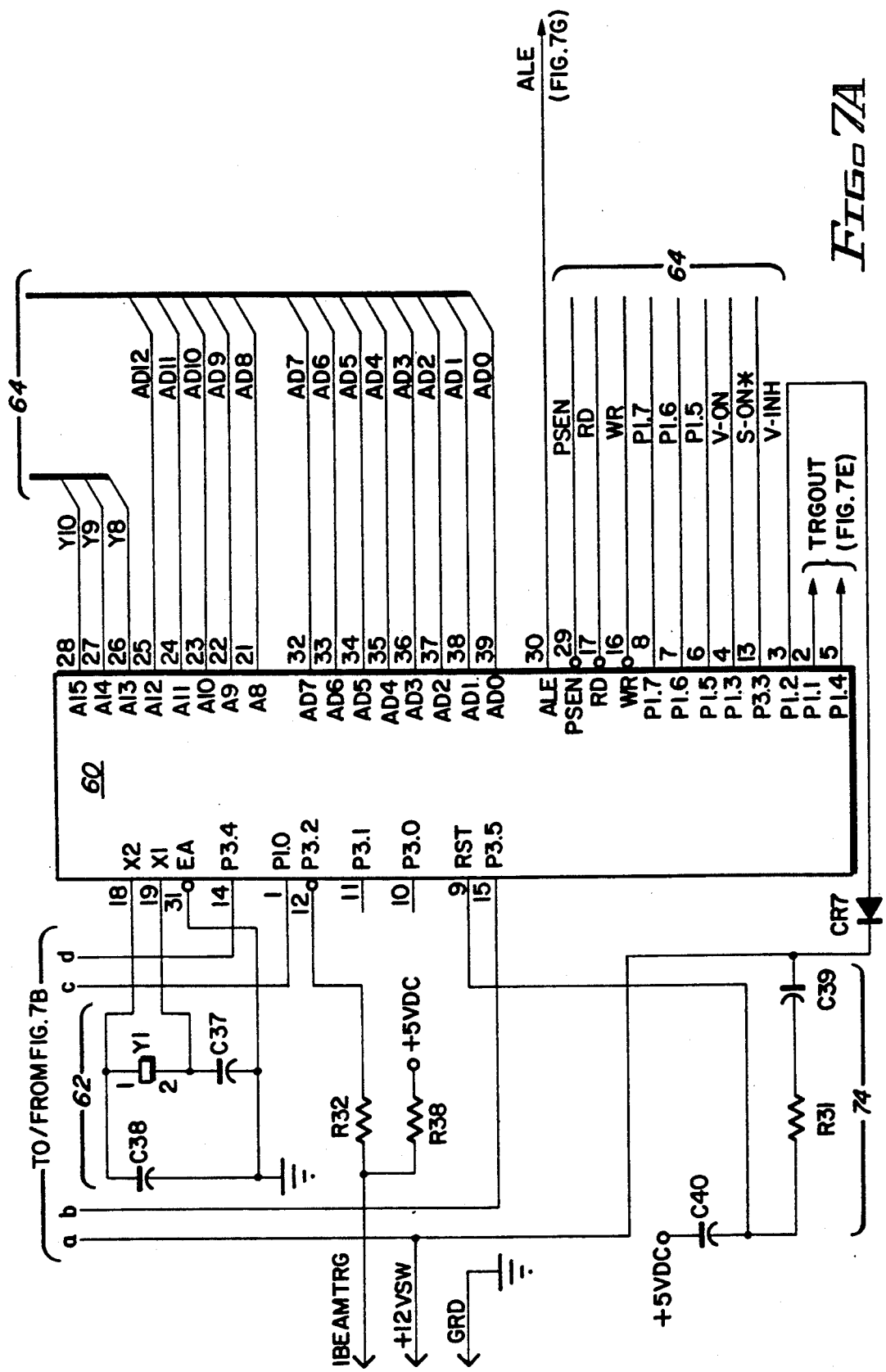

FIG. 7A shows the preferred microprocessor 60 and the manner in which it interfaces with the data bus 64, the crystal oscillator 62 (which operates at 3.58 MHz), and the reset circuit 74. FIG. 7A also illustrates the connection between the transceiver circuits of FIGS. 5, 6 and 8, and the microprocessor 60. As shown, the preferred microprocessor is an eight-bit CMOS 80C31 processor, which processor is readily available commercially, and the use of which processor is well documented in the literature.

Figure 7B:
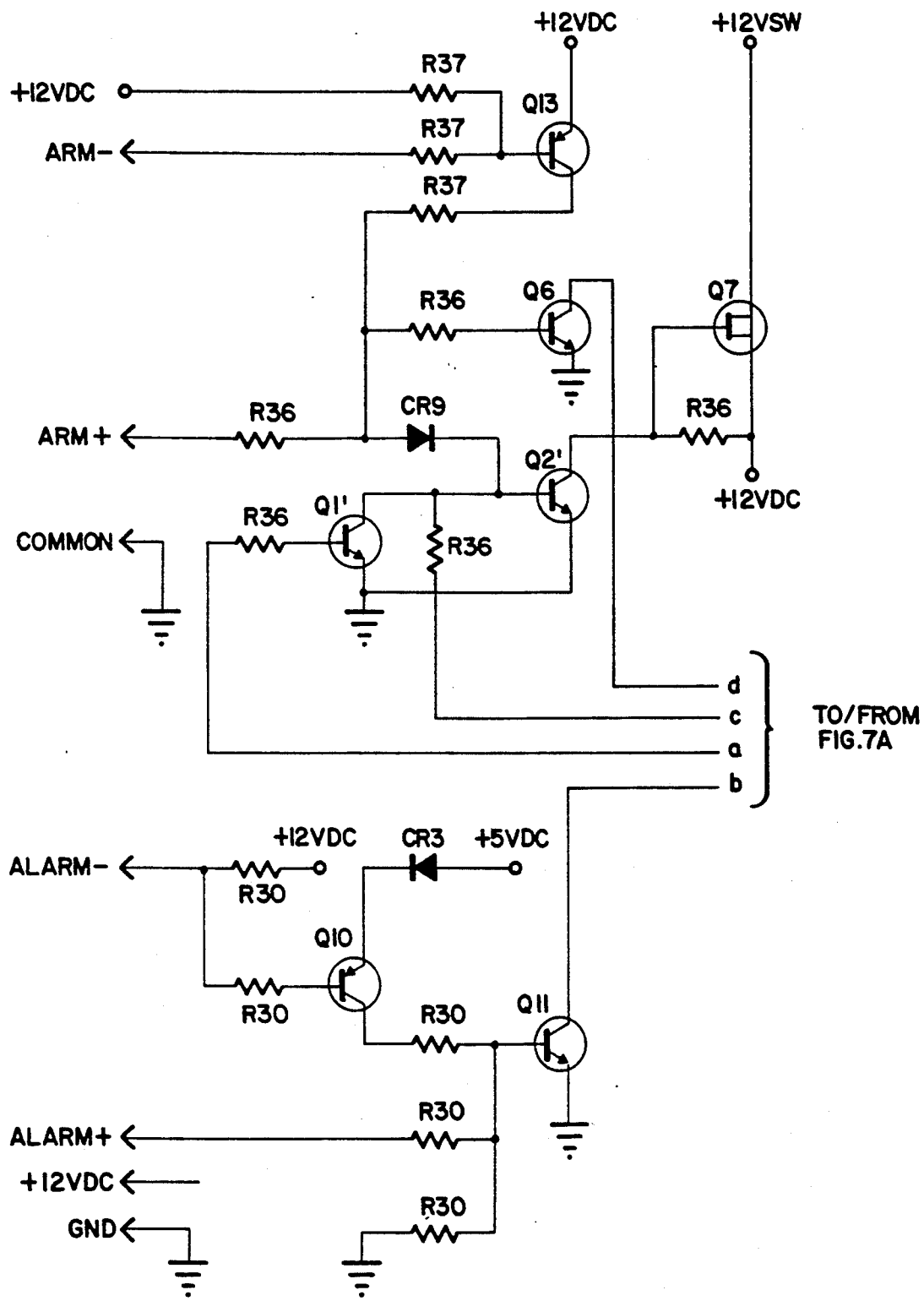

FIG. 7B illustrates the interface circuits 63 that are utilized between the arm/disarm and alarm signals and the microprocessor 60. In general, these circuits are realized with discrete transistors utilized as buffer switches. Basically, when an arm signal is received, meaning that the ARM— signal line goes low and the ARM+ line goes high, both transistors Q6 and Q13 are turned on. Transistor Q6 is an open collector signal that interfaces directly with the appropriate input pin of the microprocessor. The ARM+ line going high further turns on transistor Q2', which transistor switches on the 12VSW power line through FET transistor Q7. Positive and negative alarm signals, labeled ALARM+ and ALARM—, also control switches Q10 and Q11 in a similar manner, with Q11 providing an open collector signal that interfaces directly with the appropriate input pin of the microprocessor.

Figure 7C:
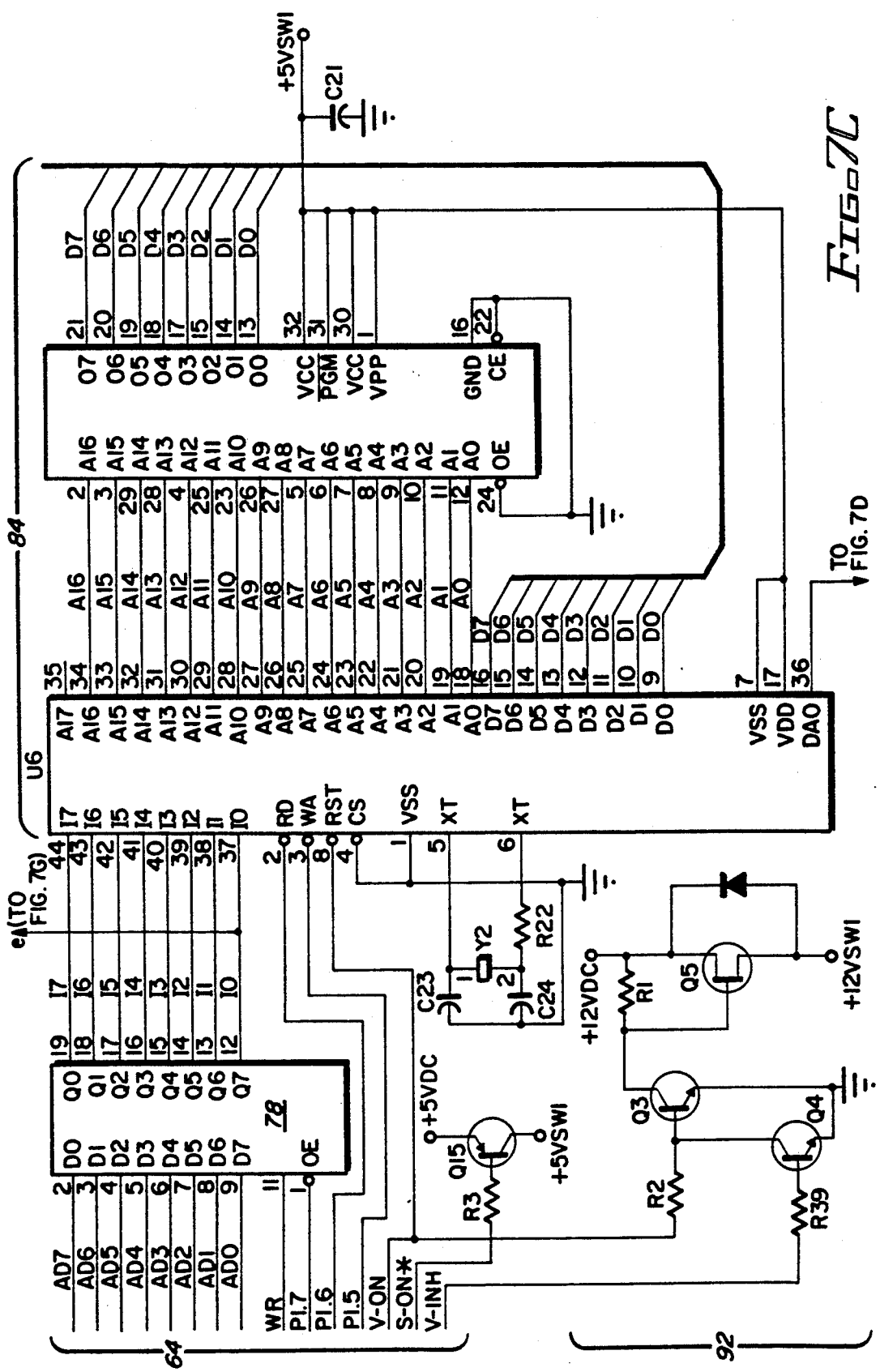

FIG. 7C shows the data latch 78 and the voice generation circuits 84. Also shown are portions of the power switching circuits 92. (The other portion of the power switching circuits 92 is included in FIG. 7B, as described above relative to the generating of the +12VSW power.) Both five volt, +5 VSW1, and twelve volt, +12 VSW1, power lines are turned on whenever the appropriate control signals from the microprocessor 60 go high or low. The voice synthesis circuits include a MSM6295 synthetic voice chip (U6) coupled to a 27C512 memory chip. The output of the voice synthesis chip U6 is labeled DAO.

FIG. 7D depicts the voice generation circuits 86. These circuits receive the synthetic speech output signal DAO and process it through a series of operational amplifiers and driver circuits and present it to the speaker cable 128. Such amplifier and driver circuits are conventional and not be described further.

FIG. 7E illustrates the interface/driver circuit 88. Trigger signals from the microprocessor 60, labeled TRGOUT, are passed through transistor buffer switches as shown for the purpose of driving appropriate signaling devices. One of these signals, labeled P1.1 on the microprocessor 60, is coupled through PNP switch Q14 and NPN switch Q12 in order to activate the lights of the vehicle being protected. The other signal, labeled P1.4 on the microprocessor 60, is similarly coupled through PNP switch Q8 and NPN switch Q9 to provide a TRIGOUT signal, present whenever the alarm of the INVISIBEAM system is triggered. This TRIGOUT signal may be used for any desired purpose, such as honking the horn, or the like.

Figure 7G:
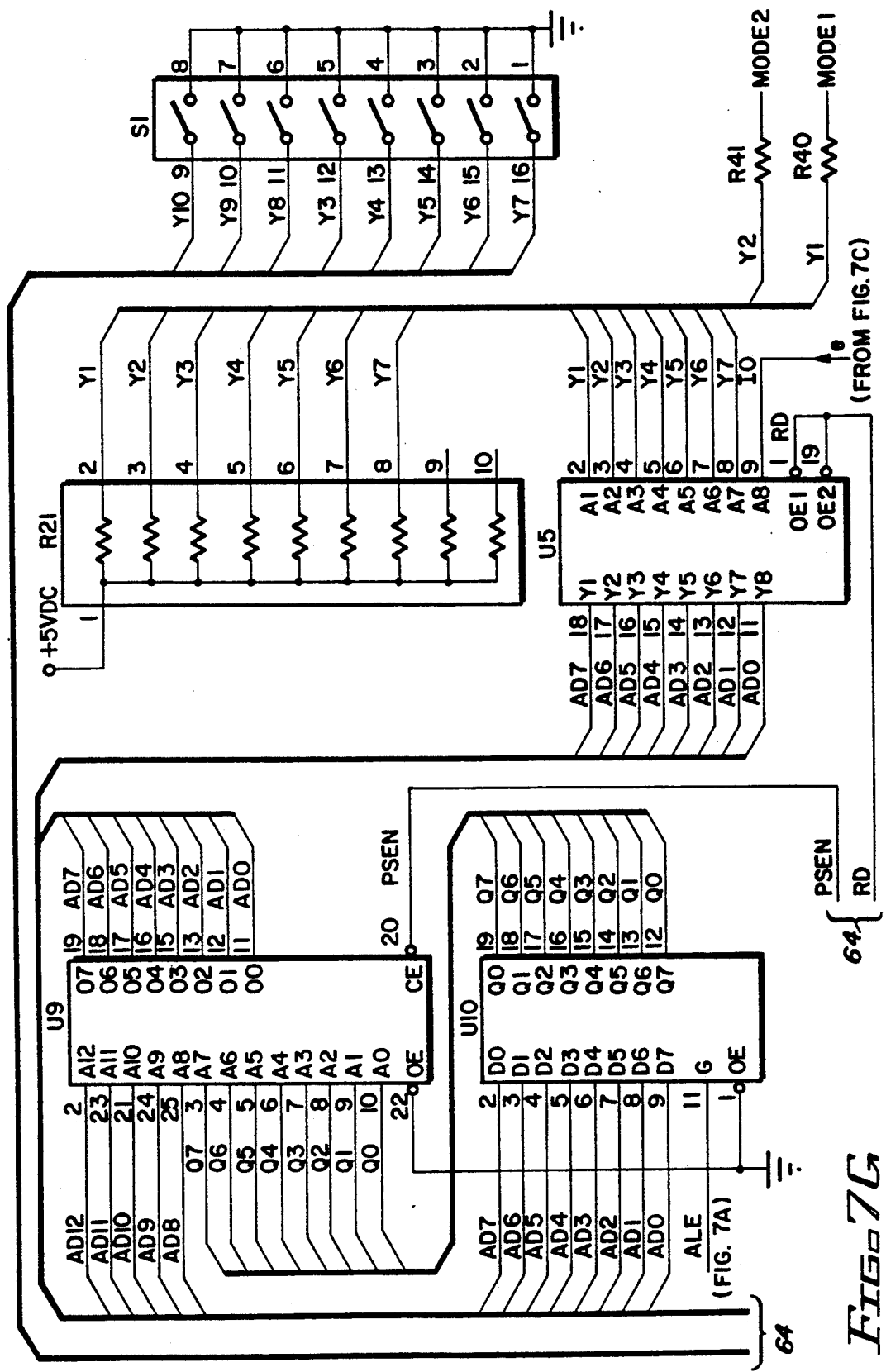
Figure 7F:
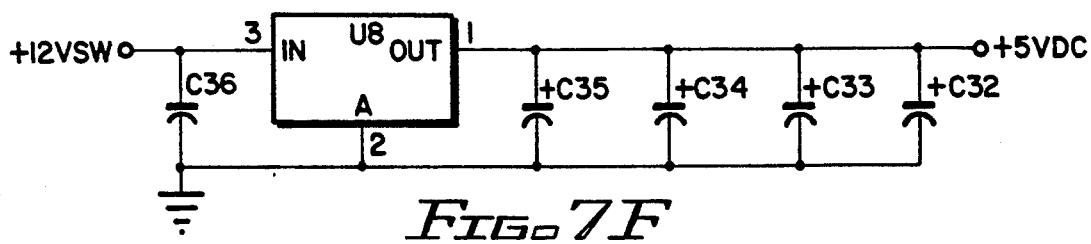

FIG. 7F shows the schematic diagram of a voltage converter and regulator that is used in the control module to convert the +12VSW power to +5 VDC, used by many of the logic circuits within the control module. The primary components of this converter include a commercially available 78L05 regulator, and a bank of filter capacitors, C32, C33, C34, C35 and C36.

FIG. 7G illustrates the preferred data latch 76, memory circuit 82, and DIP switch S1. The preferred device types for these devices are indicated in the figure. Also included in FIG. 7G are the signal lines MODE 1 and MODE 2 that are connected to an external three position toggle switch (not shown). These two signal lines can bs used, in binary fashion, to define up to four states. For example, the MODE 1 signal line is grounded through the toggle switch, MODE 1 is activated. If the MODE 2 signal line is grounded, MODE 2 is activated. If neither the MODE 1 nor the MODE 2 signal line is grounded, or if both are grounded, MODE 3 is activated.

Figure 9:
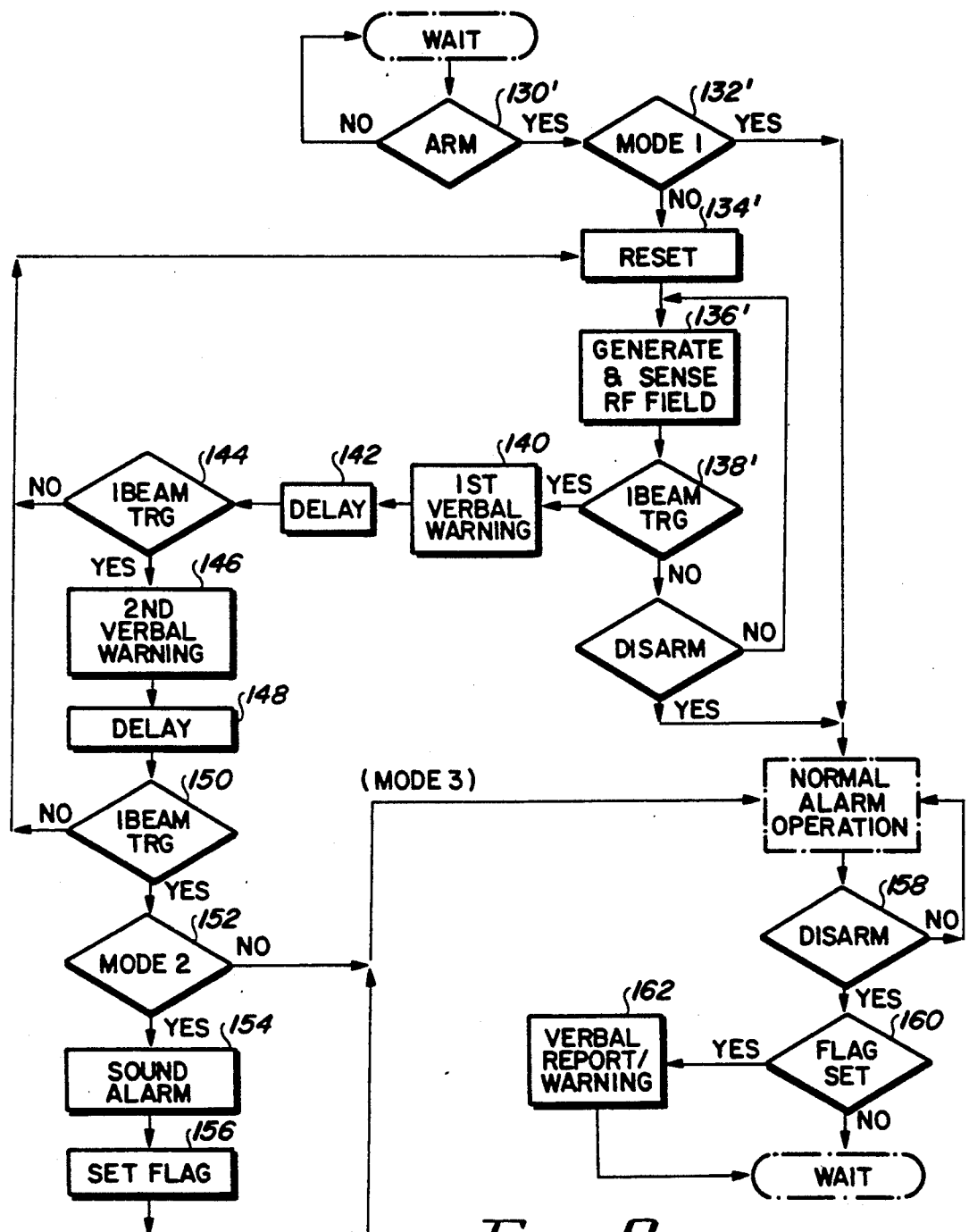
FIG. 9 is a functional flow chart illustrating the operation of the present invention.

Referring next to FIG. 9, a functional flow chart is illustrated depicting the manner in which a "slow trigger" mode of operation is carried out by the INVISIBEAM system for MODE 1, MODE 2, and MODE 3. This flow chart is generally self explanatory, and the "slow trigger" operation has been described above. Hence, no detailed explanation of the flow chart is repeated here. As general comments, however, it is noted that once the INVISIBEAM system is armed, as determined in decision block 130 of FIG. 9, and assuming that MODE 2 or MODE 3 is selected, as determined in decision block 132, the system is reset (block 134). When reset, the system begins its operation by generating and sensing any intrusions into the RF field (block 136). If any intrusions are sensed, then the INVISIBEAM trigger signal, labeled IBEAMTRG in the flow chart and in FIGS. 5 and 7A, is generated. If generated (decision block 138) the first vocal warning is given (block 140). If after a prescribed delay (block 142), typically 15 seconds, the IBEAMTRG signal is still present (decision block 144), then the second vocal warning is given (block 146). If after another prescribed delay (block 148), the IBEAMTRG signal is still present (decision block 150), and if the system is in MODE 3 (decision block 152), then the alarm is triggered (block 154).

If at any time during or after the delay periods set at blocks 142 or 148 IBEAMTRG signal is not present (indicating that the intruder is no longer in the field), the system is reset, i.e., the process returns to block 134.

If the system is disarmed after an IBEAMTRG signal has been generated (decision block 158), and if a flag has been set indicating that an alarm was sounded (decision block 160), then a verbal report/warning is provided to the user at the time of disarming (block 162). Such verbal report not only serves to notify the user that the alarm was triggered, but further serves to warn the user to be cautious in the event an intruder may still be hiding in the vehicle.

While the invention described herein has been described with reference to a particular embodiment and application thereof, numerous variations and modifications could be made thereto by those skilled in the art without departing from the spirit and scope of the invention as claimed. Accordingly, the true scope of the invention should be determined with reference to the allowed claims set forth below.

What is claimed is:

1. A vocal alarm system for use with a vehicle comprising:
    a first sensor that senses a person within a protected region around said vehicle;
    a second sensor that senses a violation event made against said vehicle while said person remains within said protected region; and
    an electronic voice generation circuit that generates a first vocal alarm message in response to sensing a person with said first sensor, and a second vocal alarm message in response to sensing a violation event with said second sensor.

2. The vocal alarm system as set forth in claim 1 wherein said first vocal message warns the person using electronically generated speech that a protected region has been entered.

3. The vocal alarm system as set forth in claim 2 wherein said second vocal message comprises an alarming speech message aimed at drawing attention to said vehicle.

4. The vocal alarm system as set forth in claim 3 further including arming means for selectively arming the operation of said first and second sensors.

5. The vocal alarm system as set forth in claim 4 wherein said arming means includes means for selectively enabling said first and second sensors.

6. The vocal alarm system as set forth in claim 4 wherein said arming means includes means for selectively enabling said electronic voice generation circuit to be responsive to said first and second sensors.

7. The vocal alarm system as set forth in claim 1 wherein the violation event sensed by said second sensor includes at least one of the violation events comprising motion of the vehicle, opening of at least one door of the vehicle, or strikes or blows made against a window of the vehicle.

8. The vocal alarm system as set forth in claim 1 wherein the violation event sensed by said second sensor includes touching said vehicle.

9. Apparatus for warning persons away from a vehicle who move within a protected region around said vehicle so as to be sufficiently near said vehicle to inflict damage thereto, sad apparatus comprising:
    a sensor that senses the presence of a person within a protected region around said vehicle; and
    electronic speech generation circuitry that generates a speech message in response to sensing a person with said sensor, said speech message informing said person that the protected region has been intruded and informing said person if said person thereafter moves out of said protected region.

10. The apparatus as set forth in claim 9 further including an audible alarm that is triggered in the event the person sensed by the sensor commits a violation event against said vehicle that involves touching said vehicle.

11. The apparatus as set forth in claim 9 wherein said electronic speech generation circuitry generates a second speech message in the event the person sensed by the sensor commits a violation event against said vehicle, said second speed message being one that draws attention to said vehicle.

12. A method of protecting an automobile from unauthorized tamper or entry comprising:
    sensing the approach of a person towards said automobile before said person touches said automobile;
    warning said person using electronically generated speech that the automobile is protected; and
    sounding an alarm in the event that a violation event occurs against said automobile.

13. The method of protecting an automobile as set forth in claim 12 further including instructing the person using electronic generated speech to move away from the automobile.

14. The method of protecting an automobile as set forth in claim 13 further including thanking the person using electronically generated speech in the event the person does move away from the automobile.

15. The method of protecting an automobile as set forth in claim 12 wherein the step of sounding an alarm upon the occurrence of a violation event includes generating electronically generated speech that draws attention to said automobile.

* * * * *